United States Patent
Aguilar-Macias et al.

(10) Patent No.: US 7,437,359 B2
(45) Date of Patent: Oct. 14, 2008

(54) MERGING MULTIPLE LOG ENTRIES IN ACCORDANCE WITH MERGE PROPERTIES AND MAPPING PROPERTIES

(75) Inventors: Hector Aguilar-Macias, Sunnyvale, CA (US); Girish Mantry, San Jose, CA (US)

(73) Assignee: ArcSight, Inc., Cupertino, CA (US)

( * ) Notice: Subject to any disclaimer, the term of this patent is extended or adjusted under 35 U.S.C. 154(b) by 361 days.

(21) Appl. No.: 11/398,863

(22) Filed: Apr. 5, 2006

(65) Prior Publication Data

US 2007/0260931 A1 Nov. 8, 2007

(51) Int. Cl.
G06F 17/30 (2006.01)

(52) U.S. Cl. .............................. 707/7; 707/6; 709/223; 709/224

(58) Field of Classification Search .................. 707/6, 707/7, 3; 709/223, 224; 358/1.15; 725/46; 706/1; 714/39
See application file for complete search history.

(56) References Cited

U.S. PATENT DOCUMENTS

| | | | |
|---|---|---|---|
| 5,717,919 | A | 2/1998 | Kodavalla et al. |
| 6,134,664 | A | 10/2000 | Walker |
| 6,192,034 | B1 | 2/2001 | Hsieh et al. |
| 6,321,338 | B1 | 11/2001 | Porras et al. |
| 6,408,391 | B1 | 6/2002 | Huff et al. |
| 6,408,404 | B1 | 6/2002 | Ladwig |
| 6,484,203 | B1 | 11/2002 | Porras et al. |
| 6,694,362 | B1 | 2/2004 | Secor et al. |
| 6,704,874 | B1 | 3/2004 | Porras et al. |
| 6,708,212 | B2 | 3/2004 | Porras et al. |
| 6,711,615 | B2 | 3/2004 | Porras et al. |
| 6,839,850 | B1 | 1/2005 | Campbell et al. |
| 6,966,015 | B2 | 11/2005 | Steinberg et al. |
| 6,988,208 | B2 | 1/2006 | Hrabik et al. |
| 7,043,727 | B2 | 5/2006 | Bennett et al. |
| 7,089,428 | B2 | 8/2006 | Farley et al. |
| 7,171,689 | B2 | 1/2007 | Beavers |

(Continued)

FOREIGN PATENT DOCUMENTS

WO WO 02/45315 A2 6/2002

(Continued)

OTHER PUBLICATIONS

U.S. Appl. No. 60/405,921, filed Aug. 26, 2002, Gisby et al.

(Continued)

*Primary Examiner*—Le Luu
(74) *Attorney, Agent, or Firm*—Fenwick & West LLP (57) ABSTRACT

A system and method for building merged events from log entries received from multiple devices. Multiple log events generally contribute to a single merged event. In the described embodiment, the mapping module receives log entries associated with specific merged events and maps them to fields in the merged event data structure in accordance with mapping properties. The described embodiments of the invention use regular expressions in the merge properties to describe values that are searched for in the received log entries. A described embodiment of the present invention gives the mapping module access to the event under construction. A new conditional operator, _oneOf, is introduced that selects the first token that is bound to a value out of a list of tokens.

19 Claims, 5 Drawing Sheets

U.S. PATENT DOCUMENTS

| | | | |
|---|---|---|---|
| 2002/0019945 A1 | 2/2002 | Houston et al. | |
| 2002/0099958 A1 | 7/2002 | Hrabik et al. | |
| 2002/0104014 A1 | 8/2002 | Zobel et al. | |
| 2002/0147803 A1 | 10/2002 | Dodd et al. | |
| 2002/0184532 A1 | 12/2002 | Hackenberger et al. | |
| 2003/0093514 A1 | 5/2003 | Valdes et al. | |
| 2003/0093692 A1 | 5/2003 | Porras | |
| 2003/0101358 A1 | 5/2003 | Porras et al. | |
| 2003/0188189 A1 | 10/2003 | Desai et al. | |
| 2003/0221123 A1 | 11/2003 | Beavers | |
| 2004/0010718 A1 | 1/2004 | Porras et al. | |
| 2004/0024864 A1 | 2/2004 | Porras et al. | |
| 2004/0044912 A1 | 3/2004 | Connary et al. | |
| 2004/0221191 A1 | 11/2004 | Porras et al. | |
| 2005/0027845 A1 | 2/2005 | Secor et al. | |
| 2005/0204404 A1 | 9/2005 | Hrabik et al. | |
| 2005/0228763 A1* | 10/2005 | Lewis et al. | 706/1 |
| 2005/0235318 A1* | 10/2005 | Grauch et al. | 725/46 |
| 2005/0243366 A1* | 11/2005 | Fukuda | 358/1.15 |
| 2006/0031719 A1* | 2/2006 | Bower et al. | 714/39 |
| 2006/0069956 A1 | 3/2006 | Steinberg et al. | |
| 2007/0043703 A1* | 2/2007 | Bhattacharya et al. | 707/3 |

FOREIGN PATENT DOCUMENTS

| | | |
|---|---|---|
| WO | WO 02/060117 A1 | 8/2002 |
| WO | WO 02/078262 A1 | 10/2002 |
| WO | WO 02/101988 A2 | 12/2002 |
| WO | WO 03/009531 A2 | 1/2003 |
| WO | WO 2004/019186 A2 | 3/2004 |

OTHER PUBLICATIONS

Arcsight, "About ArcSight Team," date unknown, [online] [Retrieved on Oct. 25, 2002] Retrieved from the Internet <URL: http://www.arcsight.com/about_team.htm>.

Arcsight, "About Overview," Oct. 14, 2002, [online] [Retrieved on Apr. 21, 2006] Retrieved from the Internet <URL: http://web.archive.org/web/20021014041614/http://www.arcsight.com/about.htm>.

Arcsight, "Contact Info," date unknown, [online] [Retrieved on Oct. 25, 2002] Retrieved from the Internet <URL: http://www.arcsight.com/contact.htm>.

Arcsight, "Enterprise Coverage: Technology Architecture," date unknown, [online] Retrieved from the Internet <URL: http://www.snaiso.com/Documentation/Arcsight/arcsight_archdta.pdf>.

Arcsight, "Managed Process: ArcSight Reporting System," date unknown, [online] Retrieved from the Internet <URL:http://www.snaiso.com/Documentation/Arcsight/arcsight_reportsys.pdf>.

Arcsight, "Managed Process: Console-Based Management," date unknown, [online] Retrieved from the Internet <URL: http://www.snaiso.com/Documentation/Arcsight/arcsight_console.pdf>.

Arcsight, "Precision Intelligence: SmartRules™ and Cross-Correlation," date unknown, [online] Retrieved from the Internet <URL: http://www.snaiso.com/Documentation/Arcsight/arcsight_correlation.pdf>.

Arcsight, "Precision Intelligence: SmartAgent™," date unknown, [online] Retrieved from the Internet <URL: http://www.ossmanagement.com/SmartAgent.pdf>.

Arcsight, "Product Info: Product Overview and Architecture," date unknown, [online] [Retrieved on Oct. 25, 2002] Retrieved from the Internet <URL: http://www.arcsight.com/product.htm>.

Arcsight, "Product Info: 360° Intelligence Yields Precision Risk Management," date unknown, [online] [Retrieved on Oct. 25, 2002] Retrieved from the Internet <URL: http://www.arcsight.com/product_info01.htm>.

Arcsight, "Product Info: ArcSight SmartAgents," Oct. 10, 2002, [online] [Retrieved on Apr. 21, 2006] Retrieved from the Internet <URL:http://web.archive.org/web/20021010135236/http://www.arcsight.com/product_info02.htm>.

Arcsight, "Product Info: ArcSight Cross-Device Correlation," date unknown, [online] [Retrieved on Oct. 25, 2005] Retrieved from the Internet <URL: http://www.arcsight.com/product_info03.htm>.

Arcsight, "Product Info: ArcSight Manager," date unknown, [online] [Retrieved on Oct. 25, 2002] Retrieved from the Internet <URL: http://www.arcsight.com/product_info 04.htm>.

Arcsight, "Product Info: ArcSight Console," date unknown, [online] [Retrieved on Nov. 15, 2002] Retrieved from the Internet <URL: http:www.arcsight.com/product_info05.htm>.

Arcsight, "Product Info: ArcSight Reporting System," date unknown, [online] [Retrieved on Oct. 25, 2002] Retrieved from the Internet <URL: http:www.arcsight.com/product_info06.htm>.

Arcsight, "Product Info: Enterprise Scaling," date unknown, [online] [Retrieved on Oct. 25, 2002] Retrieved from the Internet <URL: http://www.arcsight.com/product_info07.htm>.

Arcsight, "Security Management for the Enterprise," 2002, [online ] [Retrieved on Oct. 25, 2002] Retrieved from the Internet <URL: http:www.arcsight.com/>.

Arcsight, "Technical Brief: How Correlation Eliminates False Positives," date unknown, source unknown.

Burleson, D., "Taking Advantage of Object Partitioning in Oracle8i," Nov. 8, 2000, [online] [Retrieved on Apr. 20, 2004] Retrieved from the Internet <URL: http://www.dba-oracle.com/art_partit.htm>.

Derodeff, C. "Got Correlation? Not Without Normalization," 2002, [online] Retrieved from the Internet<URL http://www.svic.com/papers/pdf/Got-Correlation_rmalization.pdf>.

Cheung, S. et al., "Emerald Intrusion Incident Report: 601 Message Specification," Aug. 10, 2000, System Design Laboratory, SRI International.

National Institute of Standards and Technology (NIST), "Federal Information Processing Standards Publication (FIPS PUB) 199: Standards for Security Categorization of Federal Information and Information Systems", Feb. 2004.

Haley Enterprise, "Production Systems," 2002, [online] [Retrieved on Oct. 29, 2002] Retrieved from the Internet <URL: http://www.haley.com/0072567836705810/ProductionSystems.html>.

Haley Enterprise, "The Rete Algorithm," 2002, [online] [Retrieved on Oct. 29, 2002] Retrieved from the Internet <URL: http://www.haley.com/0072567836705810/ReteAlgorithm.html>.

Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.

Halme, L.R. et al., "Aint Misbehaving: A Taxonomy of Anti-Intrusion Techniques," 2000, [online] [Retrieved Nov. 1, 2002] Retrieved from the Internet <URL: http://www.sans.org/newlook/resources/IDFAQ/aint.htm>.

Lindqvist, U. et al., "Detecting Computer and Network Misuse Through the Production-Based Expert System Toolset (P-Best)," Proceedings of the IEEE Symposium on Security and Privacy, Oakland, California, May 9-12, 1999.

CERT Coordination Center, "Overview of Attack Trends," 2002, [online] Retrieved from the Internet <URL: http://www.cert.org/archive/pdf/attack_trends.pdf>.

Porras, P.A. et al., "Emerald: Event Monitoring Enabling Responses to Anomalous Live Disturbances," Oct. 1997, Proceedings of the 20th NIST-NCSC National Information Systems Security (NISS) Conference.

Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.

Ingargiola, G., "The Rete Algorithm," date unknown, [online] [Retrieved on Oct. 29, 2002] Retrieved from the Internet <URL: http://yoda.cis.temple.edu:8080/UGAIWWW/lectures/rete.html>.

Bruneau, G., "What Difficulties are Associated on Matching Events with Attacks. Why is Event/Data Correlation Important?," 2001, [online] [Retrieved on Nov. 1, 2002] Retrieved from the Internet <URL: http://www.sans.org/newlook/resources/IDFAQ/matching.htm>.

National Institutes of Health (NIH), "Table 1: Security Categorization of Federal Information and Information Systems," revised Jul. 8, 2005, [online] [retrieved on Apr. 6, 2006] Retrieved from the Internet <URL: http://irm.cit.nih.gov/security/table1.htm>.

Wood, M., et al., "Internet-Draft: Intrusion Detection Message Exchange Requirements," Jun. 23, 2002, [online] [Retrieved on Nov.

1, 2002] Retrieved from the Internet <URL: http://www.silicondefense.com/idwg/draft-ietf-idwg-requirements-07.txt>.

Herbelein, L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.

Javitz, H. S., et al., "The NIDES Statistical Component Description and Justification," SRI Project 3131, Contract N00039-92-C-0015, Annual Report, A010, Mar. 7, 1994.

Jou, Y. F., et al., "Architecture Design of a Scalable Intrusion Detection System for the Emerging Network Infrastructure," MCNC, Technical Report CDRL A005, Apr. 1997.

Porras, P. A., et al., "Live Traffic Analysis of TCP/IP Gateways," Symposium on Networks and Distributed Systems Security, Internet Society, Mar. 1998.

Robinson, S. L., "Memorandum Opinion" in *SRI International, Inc. v. Internet Security Systems, Inc. and Symantec Corporation* (D. Del., Civ. No. 04-1199-SLR), Oct. 17, 2006.

Valdes, A., et al., "Statistical Methods for Computer Usage Anomaly Detection Using NIDES (Next-Generation Intrusion Detection Expert System)," Proceedings of the Third International Workshop on Rough Sets and Soft Computing (RSSC 94), Jan. 27, 1995, San Jose, CA, pp. 306-311.

* cited by examiner

Fig. 1

Fig. 2 Process Log Entries

Map a Log Entry to a Merged Event
Fig. 3

Fig. 4
oneOf Function

Fig. 5
Example of Multiple Merged Events
under Construction

Fig. 6
Example Format for One Merged Event

MERGING MULTIPLE LOG ENTRIES IN ACCORDANCE WITH MERGE PROPERTIES AND MAPPING PROPERTIES

RELATED APPLICATIONS

The following related applications are each incorporated by reference herein:

U.S. application Ser. No. 10/308,548 of Hugh S. Njemanze et al., entitled "Modular Agent For Network Security Intrusion Detection System," filed: Dec. 2, 2002.

U.S. application Ser. No. 10/308,584 of Hugh Njemanze et al., entitled "Method For Aggregating Events To Be Reported By Software Agent," filed Dec. 2, 2002.

U.S. application Ser. No. 10/821,459 of Kenny Tidwell et al., entitled "Comparing Events From Multiple Network Security Devices," filed Apr. 9, 2004.

U.S. application Ser. No. 10/975,962 of Debabrata Dash, entitled "Security Event Aggregation At Software Agent," filed Nov. 27, 2004.

U.S. application Ser. No. 11/070,024 of Hector Aguilar-Macias et al., entitled "Message Parsing In A Network Security System, " filed Mar. 1, 2005.

TECHNICAL FIELD

The disclosed embodiments relate generally to monitoring of network activity. More particularly, the disclosed embodiments relate to a system and method for merging multiple entries representing related network activity.

BACKGROUND

It is desirable to monitor log entries received from various devices and pieces of software in a network. Frequently, those other devices or pieces of software may create several logging messages for reasons of convenience, speed, or reliability. This is done, for example, so that some information will reach the central point for the event, even if not all information does. For instance, it may be desirable to send a log message before the work is completed to make sure something is recorded even if the system later crashes before completely finishing the work in question.

In addition, certain types of log events occur in the device over time. It is considered desirable to send loggable events as they occur, instead of waiting until all loggable occurrences have happened for an event at a device.

If multiple devices send log entries to one or more central collection points in the network, the log entries for the various events from the various devices will most likely arrive interspersed with each other. The various log entries may not be adjacent in the log. They may be interleaved with very similar events. They may be spread across several log files. The sequence of entries may not be complete (perhaps the sensor crashed before the operation was completed).

What is needed is a way to automatically collect high-level event information from log entries that were generated under the problematic conditions described above.

SUMMARY

Preferred embodiments of the present invention define an agent containing a parser, a grouping tracker module, and a mapping module. The parser separates arriving log entries into tokens. The grouping tracker analyzes these tokens to determine which merged events the tokens belong to (if any). In the described embodiment, the grouping tracker operates in accordance with configurable merge properties, although other embodiments may have these properties hard-coded. The merge properties allow configuration of various properties associated with the act of grouping the log entries into high-level merged events. In the described embodiment, these properties include some or all of: what types of log entries will be considered for each merged event, which IDs are used to identify each merged event, which entries begin and end a merged event, a timeout value that automatically ends collection of entries for an existing merged event, even if no end entry is found.

In the described embodiment, the mapping module receives log entries associated with specific merged events and maps them to fields in the merged event data structure in accordance with mapping properties (although these mapping properties could also be hard-coded).

The described embodiments of the invention use regular expressions in the merge properties to describe values that are searched for in the received log entries. For example, a regular expression may define which entries are part of a multi-entry event, may detect the first entry in a multi-entry event, and may detect the last entry in a multi-entry event. The merge properties also declare which field in the entries must contain the same values in order to be merged (for instance, the entries might both have the same numeric id or mention the same ip address). The described embodiment of the present invention can process log entries for events that are interspersed with each other.

DESCRIPTION OF EMBODIMENTS

Embodiments of the present invention are now described with reference to the figures where like reference numbers indicate identical or functionally similar elements.

Figure 1:
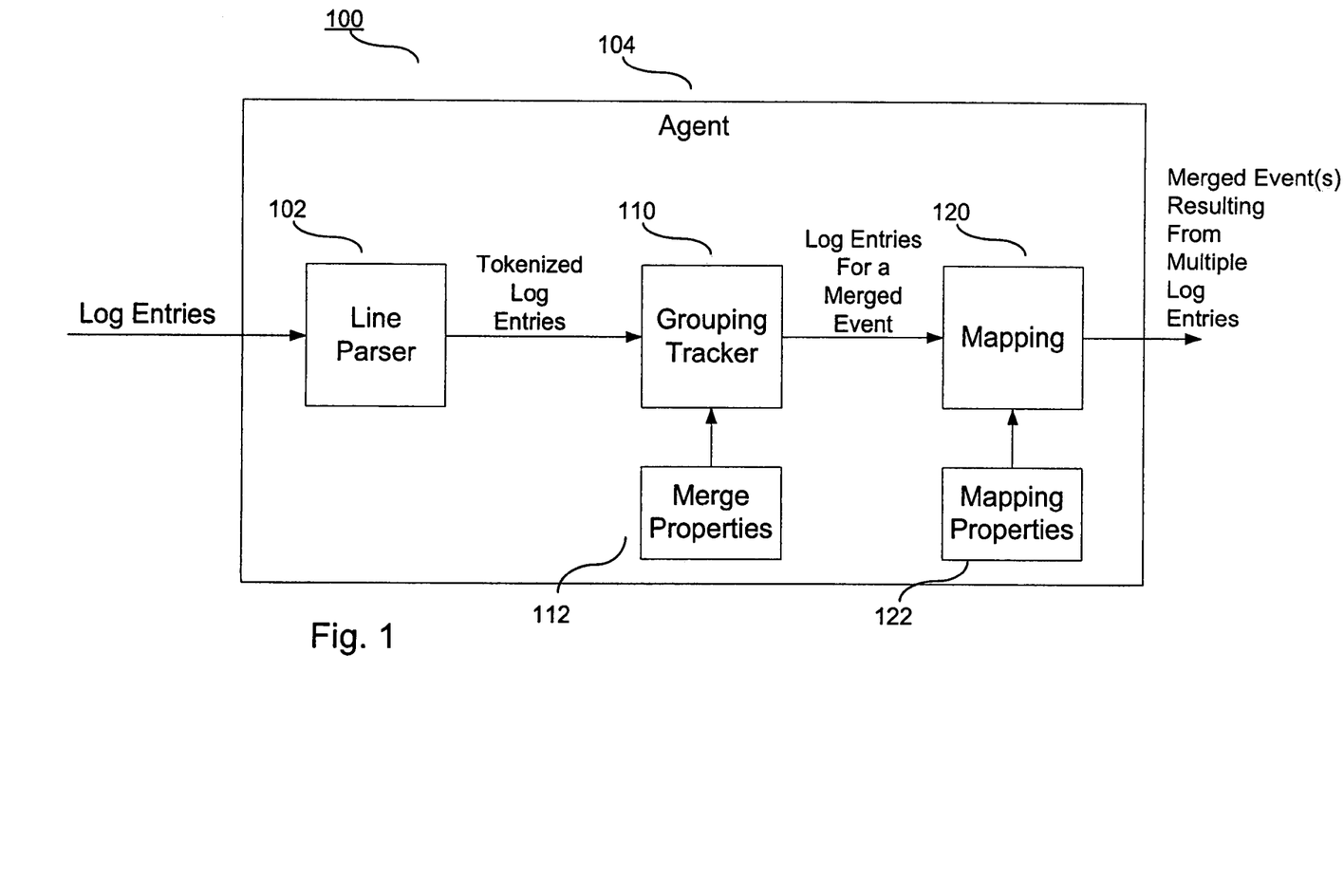
FIG. 1 shows a block diagram of a system in accordance with an embodiment of the present invention.

FIG. 1 shows a block diagram of a system 100 in accordance with an embodiment of the present invention. System 100 preferably contains an agent 104 in one or more central points in a network. Agent 104 receives log entries from multiple devices and pieces of software over a network, such as the internet, a LAN, WAN, wireless network, mobile network, or any other appropriate mechanism that allows remote devices to send log entries to agent 104.

Log entries are received by a parser 102 and parsed into tokens in a manner known to persons of ordinary skill in the art. In another embodiment, parsing is performed as described in U.S. application Ser. No. 11/070,024 of Hector Aguilar-Macias et al., entitled "Message Parsing In A Network Security System," filed Mar. 1, 2005, which is herein incorporated by reference.

The received log entries can be any appropriate format that parser 102 is able to parse. Parser 102 outputs tokens based on the received log entries. These tokens are received by a grouping tracker module 110.

Grouping tracker module 110 is connected to receive merge properties from a memory or other storage module or device 112. The merge properties specify how received log entries are to be interpreted as they are used to build merged events. Grouping tracker module outputs log entries that are associated with specific merged events into a mapping module where the log entries are mapped into merged events that are being built up from the received log entries. This mapping occurs in accordance with mapping properties 122. The output of mapping module 120 is one or more merged events resulting from multiple log entries. The process generally described in FIG. 1 will be described in more detail below in connection with an example.

EXAMPLE

Here is an example of how event merging works in an embodiment of the invention:

Assume the following lines of log entries (these are also sometimes called "messages"):

[18/Jul./2005:12:30:20-0400] conn=8 op=0 msgId=82-BIND uid=admin
[18/Jul./2005:12:30:25-0400] conn=7 op=-1 msgId=-1-LDAP connection from 10.0.20.122 to 10.0.20.12.
[18/Jul./2005:12:30:30-0400] conn=8 op=0 msgId=82-RESULT err=0

Parser 102 parses these received log entries into key-value pairs. For each log entry this yields a set of tokens. For example, the log entry:

[18/Jul./2005:12:30:20-0400]] conn=8 op=0 msgId=82-BIND uid=admin

Yields tokens having the following key/value pairs:
Date=18/Jul./2005 12:30:20
Connection=8
Operation=0
MessageId=82
OperationName=BIND
UserId=admin Similarly, the other two log entries yield their own key/value pairs:

[18/Jul./2005:12:30:25-0400]] conn=7 op=-1 msgId=-1-LDAP connection from 10.0.20.122 to 10.0.20.12
Date=18/Jul./2005 12:30:25
Connection=7
Operation=1
MessageId=-1
OperationName=LDAP
Source=10.0.20.122
Destination=10.0.20.12

[18/Jul./2005:12:30:30-0400]] conn=8 op=0 msgId=82-RESULT err=0
Date=18/Jul./2005 12:30:30
Connection=8
Operation=0
MessageId=82
OperationName=RESULT
ResultCode=0

Figure 2:
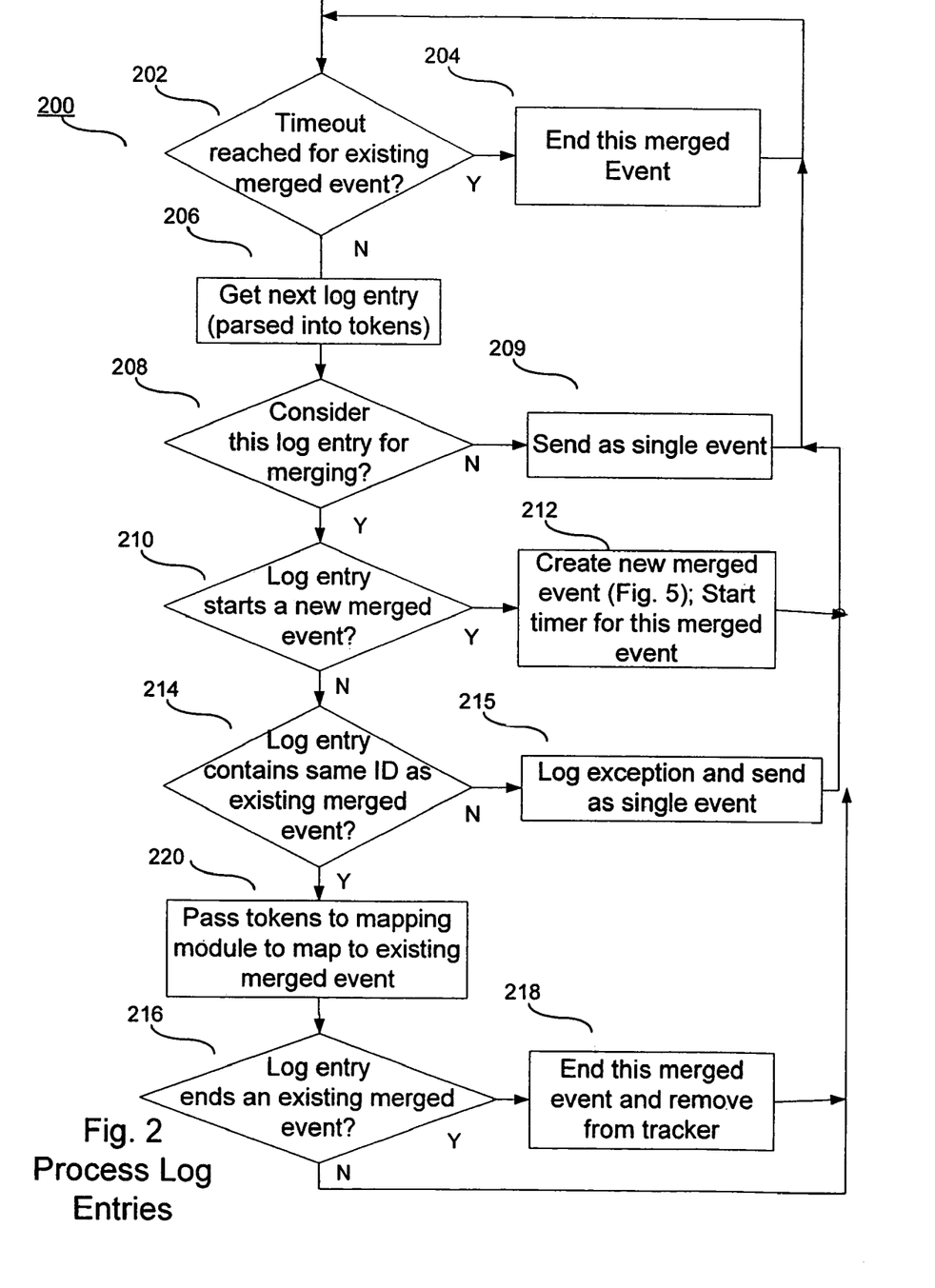
FIG. 2 is a flowchart of an embodiment of a method performed to process log entries in accordance with merge properties.

FIG. 2 is a flowchart 200 of an embodiment of a method performed to process received log entries in accordance with merge properties 112. In a preferred embodiment, the method is performed by grouping tracker module 110. If a timeout 202 is reached for a merged event currently being built, the merged event is ended 204 and control returns to element 202.

Thus, even if no explicit ending log entry is found, a merged event will be closed when its timeout occurs. The timeout value may differ for different types of logging devices and for different merged events from a single device. As described below, the timeout value is contained in the merge properties.

Element 206 receives a next log entry to process. If the log entry is to be considered for merging 208 (as defined in merge properties 112), the processing continues, otherwise a single event is sent 209 and processing returns to element 202.

Figure 5:
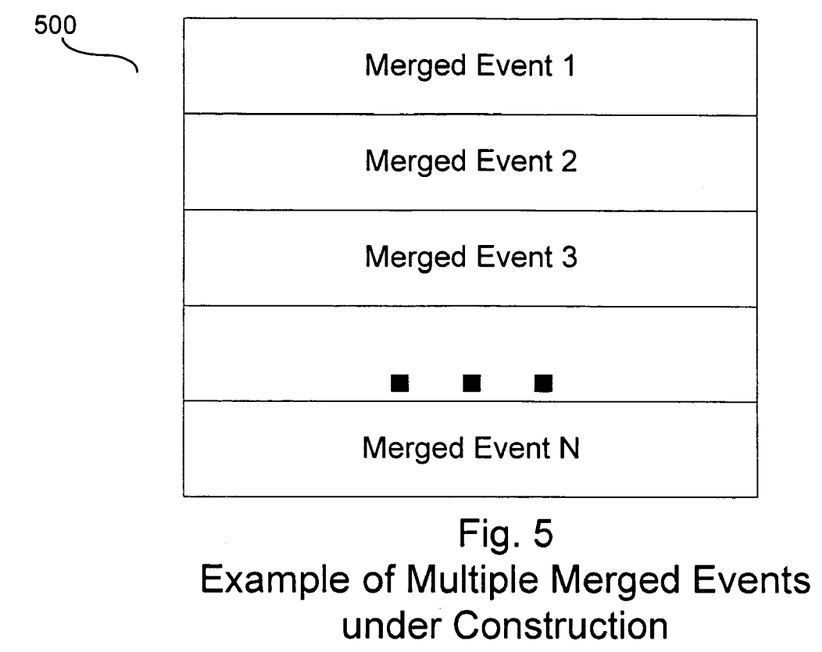
FIG. 5 shows an example in which multiple merged events are being constructed, as interspersed log entries for the various merged events are received.

If the log entry is a beginning log entry for a new merged event 210 (as defined in merge properties 112), a new merged event is opened 212 (see FIG. 5 for an example of multiple merged events in the process of being built). In some embodiments, the timeout clock for the merged event is started 212.

If the log entry is not a beginning log entry, but it contains an ID of an existing merged event currently being built 214, then an exception is logged and a single event is sent 215. Otherwise, processing continues and the tokens and log entry are passed 220 to the mapping module so that its information can be added to the merged event. In an embodiment, an ID can be a single field in the log entry or can be multiple fields in the log entry that have common values for all log entries of a merged event.

If the log entry is an end log entry for a new merged event 216 (as defined in merge properties 112), an existing merged event is ended and removed 218 from the grouping tracker module (see FIG. 5 for an example of multiple merged events in the process of being built). If a log entry indicates an event end, the corresponding merged event will be ended and removed from the structure of FIG. 5.

To continue the example, the merge properties 112 in this example are defined as:
merge.count=1
merge[0].pattern.count=1
merge[0].pattern[0].token=OperationName
merge[0].pattern[0].regex=(BIND|RESULT)
merge[0].starts.count=1
merge[0].starts[0].token=OperationName
merge[0].starts[0].regex=BIND
merge[0].ends.count=1
merge[0].ends[0].token=OperationName
merge[0].ends[0].regex=RESULT
merge[0].id.tokens=Connection,Operation,MessageId
merge[0].timeout=60000

First we indicate that we have only 1 merge operation:
merge.count=1

Then we define that we want all the messages with OperationName set to BIND or RESULT to be considered for merging:
merge[0].pattern.count=1
merge[0].pattern[0].token=OperationName
merge[0].pattern[0].regex=(BIND|RESULT)

Now we specify that the messages that have an OperationName set to BIND will start the merge operation:
merge[0].starts.count=1
merge[0].starts[0].token=OperationName
merge[0].starts[0].regex=BIND And that the merge operation will end once we find a message OperationName set to RESULT:
merge[0].ends.count=1
merge[0].ends[0].token=OperationName
merge[0].ends[0].regex=RESULT We also need to define how to identify that events belong to the same group, we do that by specifying that the values of Connection, Operation and MessageId must be identical (forming an ID for the merged event):
merge[0].id.tokens=Connection,Operation,MessageId Finally we define a timeout so that if we do not get the message with OperationName set to RESULT after 60 seconds, then we will send the event as is:

merge[0].timeout=60000

Figure 3:
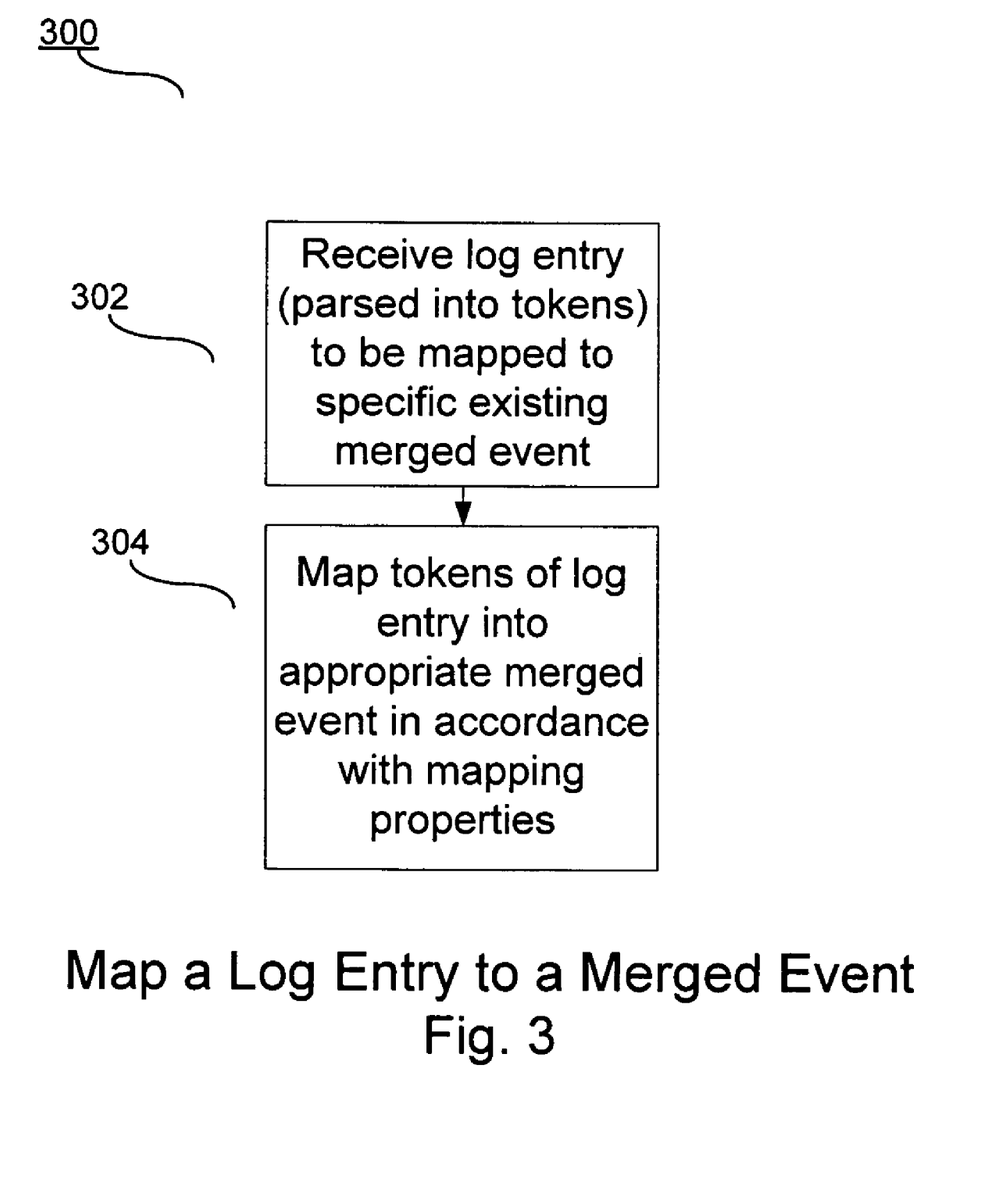
FIG. 3 is a flow chart of an embodiment of a method performed to add a log entry to a merged event in accordance with mapping properties.

FIG. 3 is a flow chart of an embodiment of a method performed to add a log entry to a merged event in accordance with mapping properties. Received log entries and their tokens have already been identified as being relevant to at least one merged event being built. Mapping module 120 maps information in the log entries to one or more merged events being built (see FIG. 5 for an example of multiple merged events being built. See FIG. 6 for examples of a format for a merged event.)

In this example, mapping properties 122 are defined as:
event.deviceReceiptTime=Date
event.name=_oneOf(mergedevent.name,OperationName)
event.deviceAction=ResultCode
event.destinationUserId=UserId These properties indicate that we will use the Date as the timestamp for the event, the ResultCode as the device action and the UserId as the destination user id. The name is defined as:

event.name=_oneOf(mergedevent.name,OperationName)

Because this framework also allows you to refer to the "tracking" event that is being used to store the final data. In this case the operation means that either we should use the OperationName or the name of the "tracking" event (if any). For example, the first event will contain the following key-values:

[18/Jul./2005:12:30:20-0400]] conn=8 op=0 msgId=82-BIND uid=admin
Date=18/Jul./2005 12:30:20
Connection=8
Operation=0
MessageId=82
OperationName=BIND
UserId=admin And a new "tracking" event will be created that will end up with the following mappings:
mergedevent.name=BIND
mergedevent.deviceReceiptTime=18/Jul./2005 12:30:20
mergedevent.destinationUserId=admin The name of the mergedevent will be BIND because this is a new mergedevent, so mergedevent.name does not exist and the value of OperationName is used (BIND). Now when the second event for the merging group is processed:

[18/Jul./2005:12:30:30-0400]] conn=8 op=0 msgId=82-RESULT err=0
Date=18/Jul./2005 12:30:30
Connection=8
Operation=0
MessageId=82
OperationName=RESULT
ResultCode=0

The merged event will be mapped as follows:
mergedevent.name=BIND
mergedevent.deviceReceiptTime=18/Jul./2005 12:30:30.
mergedevent.destinationUserId=admin
mergedevent.deviceAction=0

Notice that mergedevent.name will be set to BIND because when this event is processed there was already a "tracked" event (mergedevent) with the name set to BIND, so in this case OperationName will NOT be used and the mergedevent keeps the value BIND. Notice how the mergedevent.deviceReceiptTime now was set to 18/Jul./2005 12:30:30 that is because by default the values of mergedevent will be replaced, so deviceReceiptTime will assume the newer value.

Figure 4:
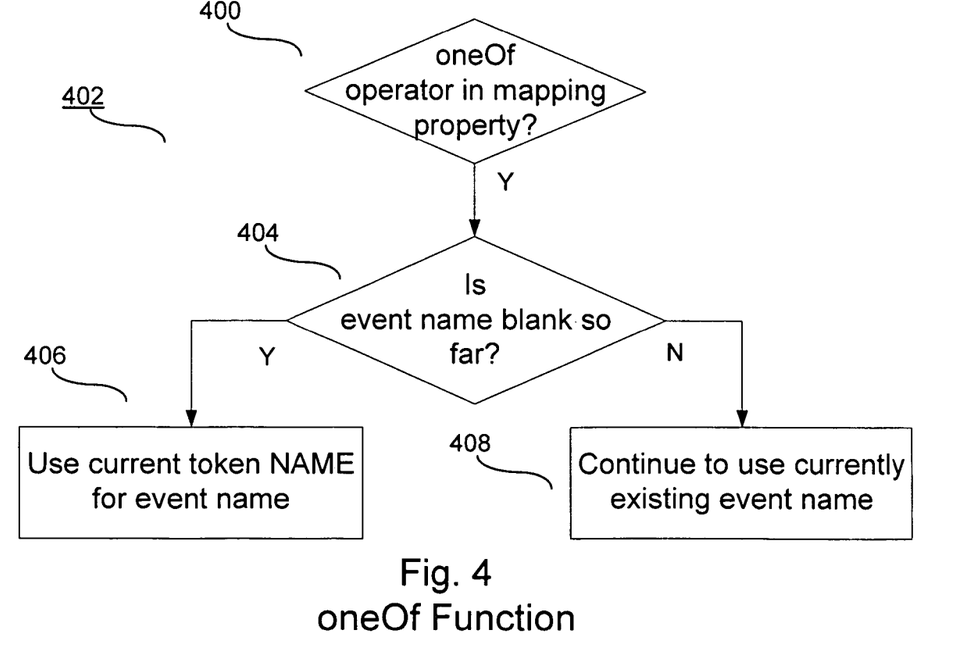
FIG. 4 is a flow chart showing a oneOf function used in the mapping properties in an embodiment of the present invention.

FIG. 4 is a flow chart 402 showing the oneOf function 400 used in the mapping properties in an embodiment of the present invention. To process the oneOf function for, for example, an event name, if the event name is currently blank 404, the current token name is used 406. If the name is not blank, the non-blank name is retained 408.

It will be understood that _oneOf is only an example of operations that can be used in the mappings component. The mapping component may contain other "operations" that can make reference to the merged event fields. _oneOf is just an example, in the actual mapping framework Other examples of operations include _concatenate, type conversion operations and others.

FIG. 5 shows an example 500 in which multiple merged events are being constructed, as interspersed log entries for the various merged events are received.

Figure 6:
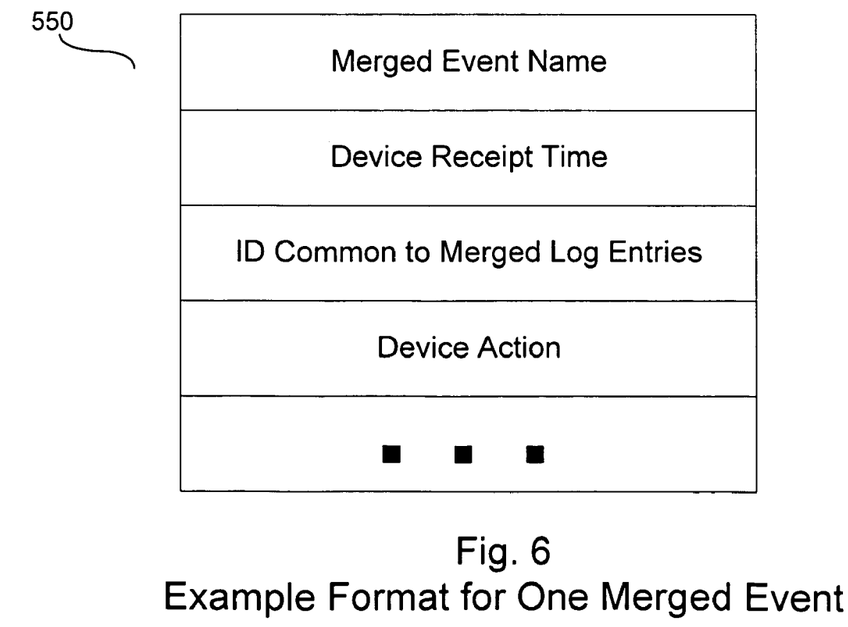
FIG. 6 shows an example format of one merged event.

FIG. 6 shows an example format 550 of one merged event. For example, each of the various merged events of FIG. 5 will have this format, although not all the values may be filled in for each merged event. Various implementations of the present invention will contain other examples of merge operations including concatenate, type conversion, counting, and others. Other embodiments include merged event aggregation so that statistics can be kept for numbers of various types of merged events. These aggregated data can be sent to a monitor alone or as part of a combination of other sent data.

The following paragraphs provide a short description of example merge properties 112 included in one embodiment of the invention:

merge.count
Defines the number of merge operations that will be defined.

merge[{mergeindex}].pattern.count
Defines how many patterns will be defined. Merge operations require patterns to define which events will be considered in the merge operation, if no patterns are given then ALL events will be considered.

merge[{mergeindex}].pattern[{patternindex}].token
Defines the token that will be used for this pattern.

merge[{mergeindex}].pattern[{patternindex}].regex
Defines the regular expression to use for this pattern.

merge[{mergeindex}].starts.count
Defines how many start patterns will be defined. Merge operations require start patterns to define which events will start a merge operation, if no patterns are given then ALL events will start a merge operation. Once the operation has been started it can only be ended via a timeout or an end pattern match.

merge[{mergeindex}].starts[{patternindex}].token
Defines the token that will be used for this start pattern.

merge[{mergeindex}].starts[{patternindex}].regex
Defines the regular expression to use for this start pattern.

merge[{mergeindex}].ends.count
Defines how many end patterns will be defined. Merge operations require end patterns to define which events will end the merge operation, if no patterns are given then no event will end a merge operation, the operation will only end via a timeout.

merge[{mergeindex}].ends[{patternindex}].token
Defines the token that will be used for this end pattern.

merge[{mergeindex}].ends[{patternindex}].regex
Defines the regular expression to use for this end pattern.

merge[{mergeindex}].timeout
Defines the timeout in milliseconds for the merging operation. If the timeout is reached then the merge operation will end and the events will be sent. Be aware that these events will be sent via a different thread, so event order is not guaranteed.

merge[{mergeindex}].id.tokens

Defines the list of tokens that will be used to group the events. This property is required.

merge[{mergeindex}].id.delimiter

Defines an optional delimiter to use for the list above, if it is not defined then the delimiter is a comma (,).

merge[{mergeindex}].sendpartialevents

This property is optional and set to false by default. Basically it specifies if each event in the merge operation must be sent individually as it is merged with other events.

merge[{mergeindex}].capacity

This property is optional and set to 1000 by default. An event merging operation requires a cache of events that hold the merged results. This defines how big the cache will be, if the cache overflows then events will be sent as they are and an error will be logged.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device,.that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for merging multiple log entries received by a data processing system, comprising:
    receiving a plurality of log entries;
    for each received log entry:
        determining if the log entry contains an ID common to any potential merged event in accordance with merge properties;
        beginning a new merged event, if the log entry is a beginning log entry of a merged event in accordance with the merge properties; and
        ending an existing merged event, if the log entry is an ending log entry of an existing merged event in accordance with the merge properties; and
    mapping each log entry containing an ID common to an existing merged event to that merged event in accordance with mapping properties for the merged event.

2. The method of claim 1, further comprising ending an existing merged event if a timeout as defined in the merge properties for that merged event occurs.

3. The method of claim 2, further comprising identifying a log entry indicating a beginning of the merged event.

4. The method of claim 2, further comprising identifying a log entry indicating an end of the merged event.

5. The method of claim 2, further comprising identifying a log entry that neither implies a start nor an end of the merged event.

6. The method of claim 2, further comprising an ability to consider the merged event as it exists so far when merging in a new entry's token.

7. The method of claim 6, wherein the ability is used in a mapping operation.

8. The method of claim 1, further comprising determining whether each received log entry is to be considered for merging in accordance with the merge properties.

9. The method of claim 1, wherein mapping a log entry to a merged event further comprises determining a time of the merged event, the time being the time of a beginning log event for the merged event.

10. The method of claim 1, wherein mapping a log entry to a merged event further comprises determining a time of the merged event, the time being the time of an ending log event for the merged event.

11. The method of claim 1, wherein mapping a log entry to a merged event further comprises mapping an event ID in accordance with the mapping properties.

12. The method of claim 1, wherein mapping a log entry to a merged event further comprises mapping an event name in accordance with the mapping properties.

13. The method of claim 1, wherein mapping a log entry to a merged event further comprises mapping a name parsed from the log entry, the mapping performed in accordance with a oneOf function in the mapping properties.

14. The method of claim 1, wherein mapping a log entry to a merged event further comprises mapping a device action in accordance with the mapping properties.

15. The method of claim 1, wherein the received log entries contain log entries corresponding to more than one merged event mixed together.

16. The method of claim 1, wherein one received log entry is used to build more than one merged event.

17. The method of claim 1, wherein an ID comprises multiple fields in the log entry, the multiple fields acting to identify log entries that contribute to a merged event.

18. A system for merging multiple log entries received by a data processing system, comprising:
    a module for receiving a plurality of log entries;
    a parser for parsing the log entries into tokens;
    a grouper that, for each received log entry:
        determines if the log entry contains an ID common to any potential merged event in accordance with merge properties;
        begins a new merged event, if the log entry is a beginning log entry of a merged event in accordance with the merge properties; and
        ends an existing merged event, if the log entry is an ending log entry of an existing merged event in accordance with the merge properties; and
    a mapper that maps each log entry containing an ID common to an existing merged event to that merged event in accordance with mapping properties for the merged event.

19. A computer program product comprising instructions stored on a computer readable medium for causing a computer to perform a method, comprising:
    receiving a plurality of log entries;
    for each received log entry:
        determining if the log entry contains an ID common to any potential merged event in accordance with merge properties;
        beginning a new merged event, if the log entry is a beginning log entry of a merged event in accordance with the merge properties; and
        ending an existing merged event, if the log entry is an ending log entry of an existing merged event in accordance with the merge properties; and
    mapping each log entry containing an ID common to an existing merged event to that merged event in accordance with mapping properties for the merged event.

* * * * *